(12) United States Patent
Yamamoto

(10) Patent No.: US 9,568,151 B2
(45) Date of Patent: Feb. 14, 2017

(54) FUEL VALVE

(75) Inventor: Hiroshi Yamamoto, Aichi (JP)

(73) Assignee: SHINFUJI BURNER CO., LTD., Aichi (JP)

( * ) Notice: Subject to any disclaimer, the term of this patent is extended or adjusted under 35 U.S.C. 154(b) by 365 days.

(21) Appl. No.: 13/990,436

(22) PCT Filed: Sep. 1, 2011

(86) PCT No.: PCT/JP2011/069920
§ 371 (c)(1),
(2), (4) Date: Aug. 6, 2013

(87) PCT Pub. No.: WO2012/073569
PCT Pub. Date: Jun. 7, 2012

(65) Prior Publication Data
US 2013/0319881 A1    Dec. 5, 2013

(30) Foreign Application Priority Data

Dec. 1, 2010  (JP) ................................. 2010-268575

(51) Int. Cl.
F17C 13/06  (2006.01)
F23K 5/02   (2006.01)
F23K 5/14   (2006.01)

(52) U.S. Cl.
CPC ............... *F17C 13/06* (2013.01); *F23K 5/02* (2013.01); *F23K 5/147* (2013.01); *F23K 2301/206* (2013.01)

(58) Field of Classification Search
CPC ........... F17C 13/06; F23K 5/147; F23K 5/02; F23K 2301/206; Y10T 137/87571; Y10T 137/87652; Y10T 137/87668; Y10T 137/87684; Y10T 137/87692

(Continued)

(56) References Cited

U.S. PATENT DOCUMENTS

| 1,502,483 | A | * | 7/1924 | O'Flaherty et al. | ...... 137/625.13 |
| 2,018,853 | A | * | 10/1935 | Hitchcock | ...................... 137/209 |

(Continued)

FOREIGN PATENT DOCUMENTS

JP    36-31188    11/1961
JP    61-086512   5/1986

(Continued)

OTHER PUBLICATIONS

International Search Report issued Oct. 18, 2011 in International (PCT) Application No. PCT JP2011/069920.

(Continued)

*Primary Examiner* — Marina Tietjen
*Assistant Examiner* — Daphne M Barry
(74) *Attorney, Agent, or Firm* — Wenderoth, Lind & Ponack, L.L.P.

(57) ABSTRACT

A fuel valve includes a cylindrical flow adjusting member having a cylindrical surface formed with two circumferentially extending V-shaped grooves for liquid fuel and air, respectively. The fuel valve further includes liquid fuel and air supply pipes having O-rings at their respective discharge ports which are kept in abutment with the cylindrical surface such that when the flow rate adjusting member is rotated to a position where the V-shaped grooves extend across and protrude from the respective O-rings, the discharge ports of the supply pipes communicate with the respective V-shaped grooves, so that liquid fuel and air flow. The depths, widths and positions of the respective V-shaped grooves are determined corresponding to an igniting position (preheating step), normal burning positions (high heat to low heat), and a discharge position such that the flow rates of liquid fuel and air can be adjusted in synchronization with each other.

9 Claims, 6 Drawing Sheets

(58) Field of Classification Search
USPC .............................. 251/160, 181, 207, 109
See application file for complete search history.

(56) References Cited

U.S. PATENT DOCUMENTS

| | | | | |
|---|---|---|---|---|
| 2,129,100 | A * | 9/1938 | Pickup ........................ | 137/212 |
| 2,145,383 | A * | 1/1939 | Alden ...................... | 137/625.11 |
| 2,291,563 | A * | 7/1942 | Rotter et al. ............. | 137/625.68 |
| 2,406,524 | A * | 8/1946 | Ashton et al. ............ | 137/636.4 |
| 2,630,325 | A * | 3/1953 | Reynolds ................ | 137/625.17 |
| 2,833,311 | A * | 5/1958 | Baldelli ..................... | 138/43 |
| 2,940,674 | A * | 6/1960 | Hanje ..................... | F23D 91/02 |
| | | | | 137/239 |
| 3,049,149 | A * | 8/1962 | Brueder .................. | 137/625.17 |
| 3,231,234 | A * | 1/1966 | Williamson ........... | B21D 24/02 |
| | | | | 251/209 |
| 3,285,278 | A * | 11/1966 | Corlett ....................... | 137/454.2 |
| 3,814,129 | A * | 6/1974 | Cioffi ..................... | 137/625.11 |
| 3,882,883 | A * | 5/1975 | Droegemueller ............. | 137/270 |
| 4,575,043 | A | 3/1986 | Braatz | |
| 4,915,133 | A * | 4/1990 | Harrison .................. | 137/625.47 |

FOREIGN PATENT DOCUMENTS

| | | |
|---|---|---|
| JP | 02-051670 | 2/1990 |
| JP | 06-235466 | 8/1994 |
| JP | 2010-236686 | 10/2010 |

OTHER PUBLICATIONS

Written Opinion of the International Searching Authority (with English translation), issued Oct. 18, 2011 in International PCT Application No. PCT/JP2011/069920.

* cited by examiner

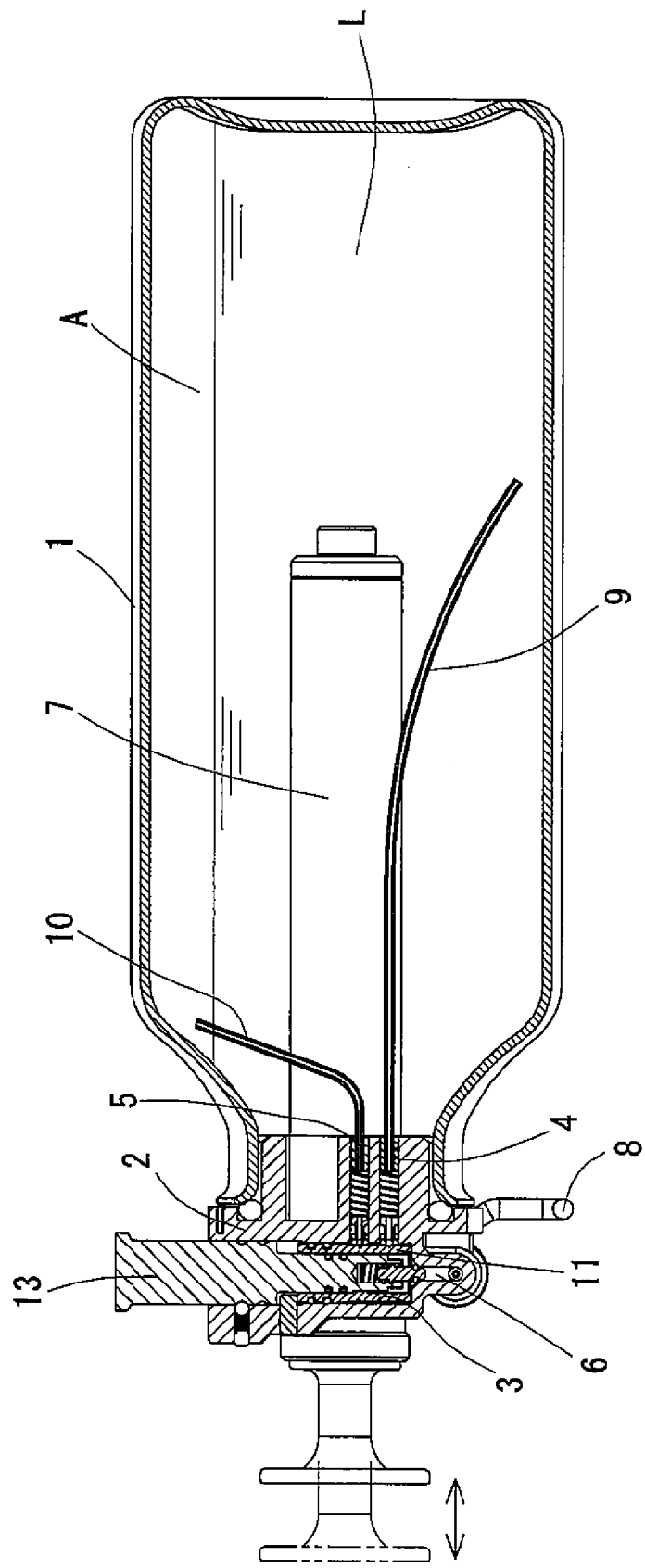

FUEL VALVE

TECHNICAL FIELD

This invention relates to a fuel valve for burners such as those used outdoors.

BACKGROUND ART

Typically, burners such as those used outdoors include a fuel tank (such as a portable fuel bottle) containing fuel, a burner head and a flow rate adjusting valve. Fuel in the tank is fed to the burner head through the flow rate adjusting mechanism and burned. Such burners include the type in which vaporized fuel is taken out of the fuel tank and burned, and the type in which liquid fuel is taken out of the fuel tank, vaporized in a vaporizer, and the thus vaporized fuel is burned.

In order to control the flow rate of liquid fuel or vaporized fuel, a needle valve, a ball valve, or a regulator valve is ordinarily used.

As disclosed in U.S. Pat. No. 4,575,043, needle valves include a valve box, and a needle shaft and a valve seat both mounted in the valve box, the needle shaft being formed with a thread on the outer periphery and having a tapered tip, and the valve seat being formed with an orifice coaxial with the needle shaft. When the needle shaft is rotated about its axis in one or the other direction, the needle shaft is pushed into or pulled out of the orifice. When the needle shaft is pushed into or pulled out of the orifice, the gap between the tapered tip of the needle shaft and the inner wall of the orifice (which corresponds to the degree of opening of the valve) changes, making it possible to adjust the flow rate of fuel.

As disclosed in JP Patent Publication 2010-236686A, ball valves include a valve formed with a hole and having a shaft. By operating the shaft, it is possible to change the relative position between the hole and the gas passage, thereby changing the width of the flow passage corresponding to the degree of overlapping of the hole and the gas passage. It is thus possible to adjust the flow rate of fuel.

JP Patent Publication 6-235466A shows one of the above-described regulator valves which uses a diaphragm. This valve adjusts the flow rate of fuel by changing the pressure on the secondary side (outer side) relative to the pressure on the primary side (inner side).

After the flow rate has been adjusted, the fuel is fed to the burner through a fuel hose or directly from the fuel supply port of the fuel valve.

Especially if a liquid fuel is used as fuel for a burner and the fire power is adjusted by adjusting the flow rate of the liquid fuel, it is necessary to control the flow rate with high accuracy, because liquid fuel is expanded to 200 times or more of its original volume when vaporized, so that a slight change in the flow rate of liquid fuel can lead to a large change in fire power.

While it is necessary to vaporize liquid fuel in the vaporizer, while the vaporizer is not sufficiently heated immediately after the use of the burner, it cannot be vaporized. Thus, a preheating step is ordinarily carried to preheat the vaporizer by burning a small amount of liquid fuel impregnated in e.g. glass wool provided near the vaporizer.

Any of the above-mentioned needle valves, ball valves and regulator valves offers problems in stably adjusting the flow rate.

In a needle valve, the smaller the thread pitch, the shorter the distance by which the thread advances per unit rotational angle, and thus more finely it is possible to adjust the flow rate. But it is practically impossible to infinitely reduce the thread pitch because the smaller the thread pitch, the lower the resistance to e.g. wear. Thus, it is impossible to adjust the flow rate of liquid fuel in a sufficiently fine manner required for liquid fuel.

Thus, in a burner of the type in which liquid fuel is directly supplied from the fuel tank, the flow rate is ordinarily adjusted in two stages, i.e. a stage (1) in which the flow rate of liquid fuel is roughly adjusted using a needle valve at the fuel outlet port of the fuel tank, and a stage (2) in which after the liquid fuel has been vaporized, the flow rate of the vaporized fuel is finely adjusted by a valve for vaporized fuel which is provided near the burner. This complicates the entire device, increases the cost of the device, and makes it more difficult to operate the device.

It is possible to finely adjust the flow rate of fuel by reducing the diameter of the orifice of the fuel passage in a needle valve or a ball valve. But if a liquid fuel such as gasoline for motor vehicles is used, foreign matter such as soot tends to adhere to the inner wall of the orifice, thus clogging the orifice. Since regulator valves are complicated in structure and made up of a large number of parts, they are expensive and less durable.

The preheating step in which liquid fuel impregnated in e.g. glass wool is burned is extremely troublesome for inexperienced users. Soot tends to be produced during this preheating step, which could soil e.g. the burner and cooking utensils placed on the burner. Flames produced during this preheating step are weaker in force than flames produced by the burner and can be shaken by the wind. Thus, on a windy day, it is difficult to direct the flames produced during the preheating step at the burner (especially the vaporizer), thus making it difficult to sufficiently heat the vaporizer.

SUMMARY OF THE INVENTION

A first object of the present invention is to provide a fuel valve which is simple in structure and which can accurately adjust the flow rate of fuel to be supplied to a burner. A second object of the invention is to provide a fuel valve which makes it possible to produce flames which can sufficiently heat the burner during a preheating step.

In order to achieve the first object, the present invention provides a fuel valve comprising a flow rate adjusting member formed with at least one recess in a surface of the flow rate adjusting member, and at least one supply pipe having a first end located in a tank in which fuel is stored, and a second end kept in abutment with the surface of the flow rate adjusting member, wherein the recess and the supply pipe are configured such that the recess can be moved relative to the second end to a predetermined position where the recess extends across and protrudes from the second end, whereby fuel can flow through a gap defined between the supply pipe and the recess.

When the second end abuts the flow rate adjusting member where there is not the recess, the second end is liquid-tightly or gas-tightly closed, so that the flow of fuel stops. When the recess is moved relative to the second end until the supply pipe communicates with an external flow passage through the recess, fuel begins to flow.

The flow rate of fuel is adjustable because the shape (e.g. the depth and/or width) of the recess is different from one position to another. For example, by using a narrow and shallow recess, it is possible to feed fuel at a very small rate. By forming the recess such that its shape moderately changes, it is possible to finely adjust the flow rate.

In order to achieve the second object, the present invention provides a fuel valve comprising supply pipes having first ends, respectively, located in a tank in which liquid fuel and air coexist such that the liquid fuel and the air can flow through the respective supply pipes, whereby flow rates of the liquid fuel and air can be individually adjusted.

With this arrangement, since the flow rates of liquid fuel and air are separately adjustable, it is possible to simplify the preheating step at a burner which uses liquid fuel. In particular, by supplying air in the fuel tank to the burner together with liquid fuel and injecting both liquid fuel and air through the nozzle, it is possible to take in air necessary to burn the fuel, in addition to the air in the fuel tank, making it possible to generate optimum flames for heating the burner. The flow rates of liquid fuel and air can be adjusted by known adjusting means, such as flow rate adjusting valves, provided in the respective flow passages.

As used herein, the word "air" refers both to a mixture of air pressurized by the below-described air pump and sealed in the fuel tank, and a portion of liquid fuel vaporized in the fuel tank.

Preferably, this fuel valve further includes a flow rate adjusting member formed with recesses in a surface of the flow rate adjusting member, wherein the supply pipes have second ends, respectively, kept in abutment with the surface of the flow rate adjusting member, wherein the recesses and the supply pipes are configured such that the recesses can be moved relative to the respective second ends to predetermined positions where the recesses extend across and protrude from the respective second ends, whereby the liquid fuel and the air can flow through gaps defined between the respective supply pipes and the corresponding recesses.

With this arrangement, in which the flow rates of the liquid fuel and the air are adjusted by abutting the second ends of the respective supply pipes on the surface of the flow rate adjusting member, it is possible to adjust the flow rates of the liquid fuel and the air in synchronization with each other. By properly adjusting the shapes (e.g. the depths and/or widths) of the respective recesses, as described above, it is possible to separately and finely adjust the flow rates of liquid fuel and air according to the burning state.

This flow rate adjusting member is preferably a cylindrical member, and the surface of the flow rate adjusting member, in which the at least one recess is formed, is a cylindrical surface.

By using such a cylindrical flow rate adjusting member, it is possible to e.g. form the recess so as to extend over the entire circumference of 360 degrees, thus considerably reducing the size of the flow rate adjusting member compared to a conventional flat flow rate adjusting member without sacrificing its flow rate adjusting function.

Further preferably, the at least one recess is a groove extending in a direction in which the recess moves, and the recess has a depth or width that changes in this direction such that the groove has a sectional area that changes in this direction, whereby the flow rate of fuel that flows through the groove is adjustable.

By using such a groove-shaped recess, it is possible to reduce the possibility of the recess being clogged with foreign matter, thus preventing the flow of fuel, as in the case with the orifice of a needle valve.

In an arrangement in which the flow rates of liquid fuel and air are adjusted in synchronization with each other, preferably, the flow rate adjusting member is a cylindrical member which is rotatable about an axis thereof, and has a cylindrical surface as the surface in which the recesses are formed, the recesses are grooves extending in the rotational direction of the flow rate adjusting member and capable of adjusting the flow rates of the liquid fuel and the air, respectively, the flow rate adjusting member having an igniting position, heat adjusting positions, and a discharge position which correspond to respective rotational angles of the flow rate adjusting member such that at the igniting position, the recesses for the liquid fuel and the air are both aligned with the respective second ends, wherein at the heat adjusting positions, the portion of the recess for the liquid fuel that is aligned with the corresponding second end is larger in sectional area at a higher heat position of the heat adjusting positions than at a lower heat position of the heat adjusting positions, and at a discharge position, only the recess for the air is aligned with the corresponding second end.

Burning at the igniting position corresponds to the above-described preheating step. When the flow rate adjusting member is further turned upon completion of the preheating step, normal burning begins immediately after the preheating step. During the normal burning, the fire power is adjustable. Thus, the burning control is easy compared to conventional burners.

By feeding only air at the discharge position, it is possible to quickly extinguish flames, and simultaneously to discharge liquid fuel that remains in the burner and the fuel pipes. This prevents stain on the burner and fuel pipes, as well as clogging, due to impurities in the remaining liquid fuel. Also, since the pressure in the tank is reduced to the atmospheric pressure after use, the tank can be hand-carried and stored more safely.

According to the present invention, in order to achieve the first object, the second end of the fuel supply pipe is kept in abutment with the surface of the flow rate adjusting member in which the recess is formed such that fuel flows when the recess is positioned so as to extend across and protrude from the second end. With this arrangement, it is possible to easily and accurately control the flow rate by changing the shape of the recess.

In order to achieve the second object, flow rate adjusting means are provided in the respective passages for liquid fuel and air so that the flow rates of liquid fuel and air are separately adjustable. By separately adjusting the flow rates of liquid fuel and air, it is possible to easily supply optimum amounts of liquid fuel and air into the burner during the preheating step, in which it is especially difficult to adjust the ratio between liquid fuel and air. Thus, it is possible to generate flames suitable to heat the burner.

BRIEF DESCRIPTION OF THE DRAWINGS

FIG. 1 is a vertical sectional view of a fuel tank including a fuel valve according to the present invention.

FIGS. 6(a) and 6(b) show a different cylindrical flow rate adjusting member used in the fuel valve according to the present invention, which is formed with recesses (V-shaped grooves) for liquid fuel and air, respectively, of which FIG. 6(a) is a sectional view of the flow rate adjusting member when the recesses (V-shaped grooves) are developed in the circumferential direction of the cylinder, and FIG. 6(b) is a sectional view of the flow rate adjusting member in the lateral width direction of the recesses (V-shaped grooves) at respective positions L to P shown in FIG. 6(a).

DETAILED DESCRIPTION OF THE INVENTION

Figure 2A:
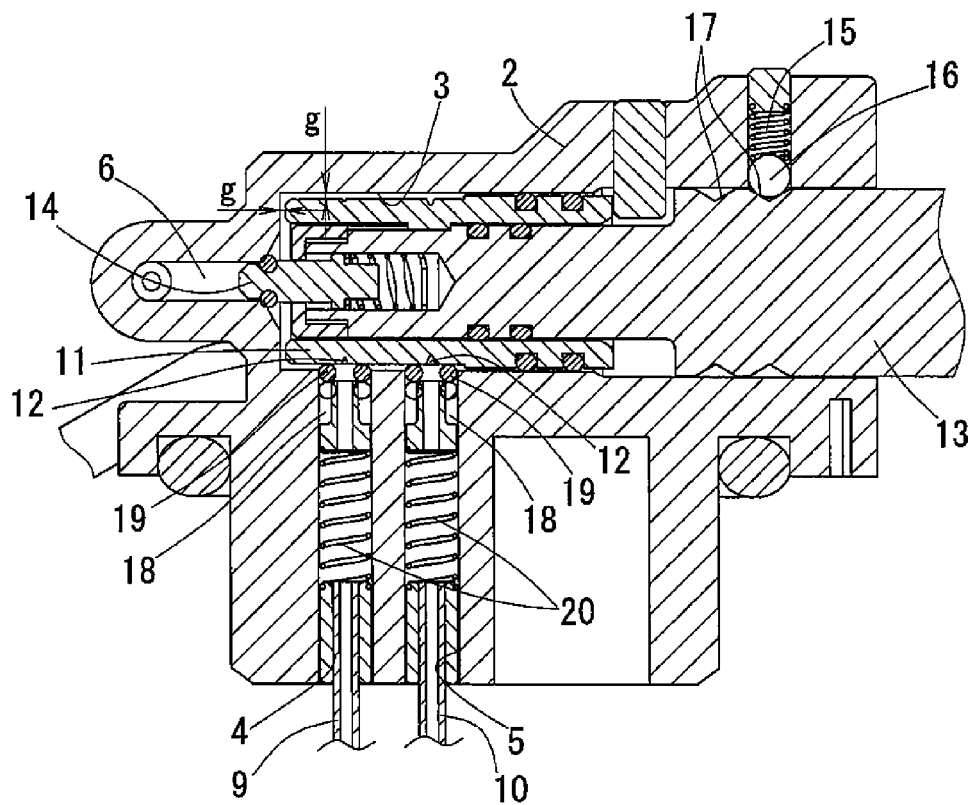
FIGS. 2(a) and 2(b) are sectional views of the fuel valve shown in FIG. 1, showing the state in which a safety valve is closed, and the state in which the safety valve is open, respectively.
Figure 2B:
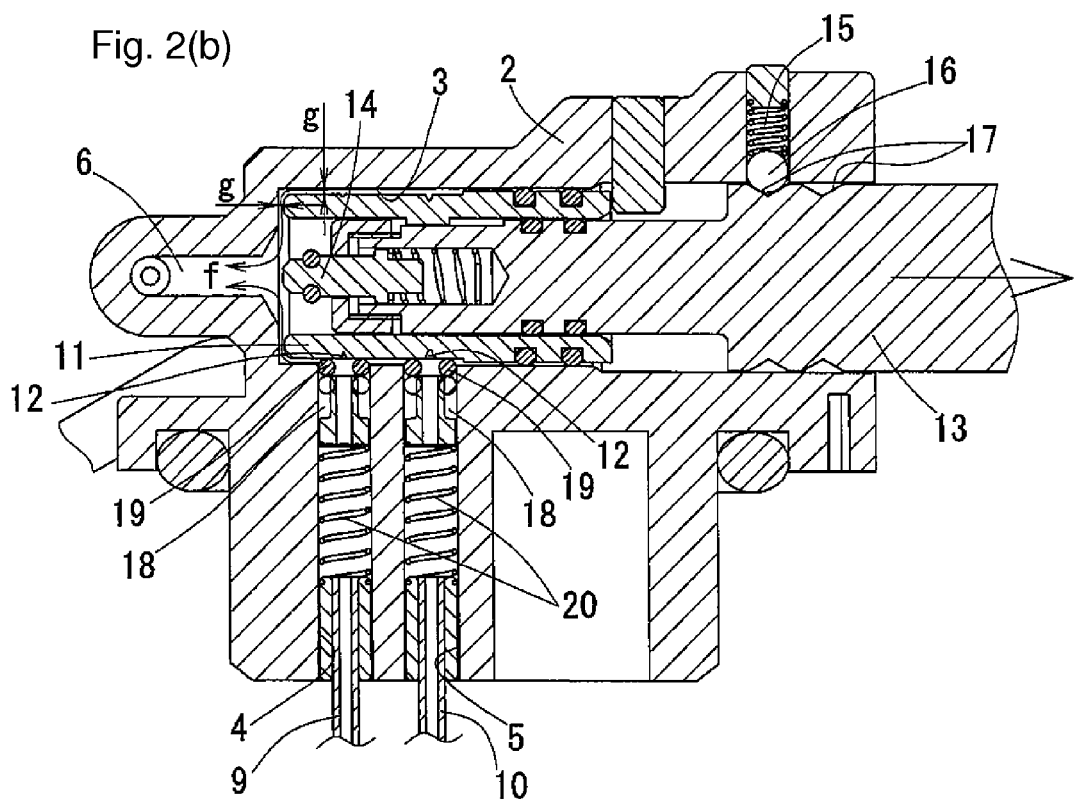

FIG. 1 shows a fuel tank including a fuel valve according to the present invention. FIGS. 2(a) and 2(b) show the fuel valve. The fuel valve is used to feed a liquid fuel L, such as gasoline or kerosene, in the tank 1 to a burner (not shown). The fuel valve is arranged in a horizontally extending position.

A cap 2 is fitted on the opening of the tank 1. The cap 2 defines a fuel mixing chamber 3, a liquid fuel passage 4, an air passage 5 and a fuel discharge port 6. Air is fed into the tank 1 by an air pump 7 to pressurize the interior of the tank 1. The tank 1 is held in the horizontal position by a stand 8.

A liquid fuel supply pipe 9 and an air supply pipe 10 are located in the tank 1. The liquid fuel supply pipe 9 has its first end (suction port) located in the liquid fuel L. The air supply pipe 10 has its first end (suction port) located in the air A in the tank. The liquid fuel supply pipe 9 and the air supply pipe 10 have their second ends (outlet ports) connected to the liquid fuel passage 4 and the air passage 5, respectively.

A cylindrical flow rate adjusting member 11 is received in the fuel mixing chamber 3. A predetermined gap g is defined between the inner wall of the fuel mixing chamber 3 and the cylindrical surface of the flow rate adjusting member 11 through which fuel can flow. Two V-shaped circumferential grooves 12 are formed in the cylindrical surface of the flow rate adjusting member 11.

A flow rate adjusting knob 13 is pressed in the flow rate adjusting member 11 so as to be coaxial with the member 11. The flow rate adjusting knob 13 is axially slidable relative to the flow rate adjusting member 11 within a predetermined range, and is rotationally fixed to the flow rate adjusting member 11 by means of keys (not shown) so as to be rotatable about the common axis together with the flow rate adjusting member 11. By adjusting the rotational angle of the flow rate adjusting knob 13, it is possible to adjust the flow rates of liquid fuel L and air A.

The flow rate adjusting knob 13 also serves as a valve shaft of a safety valve, and carries a valve body 14 of the safety valve at its distal end. By axially sliding the flow rate adjusting knob 13 toward its distal end, the fuel discharge port 6 is closed by the valve body 14 (as shown in FIG. 2(a)). In this state, even if the flow rate adjusting knob 13 is inadvertently rotated while hand-carrying the fuel tank, liquid fuel L never flows out of the tank. When the valve body 14 is opened by sliding the flow rate adjusting knob 13 in the opposite axial direction, liquid fuel L flows (in the direction shown by the arrows f in FIG. 2(b)) at a rate determined by the rotational angle of the knob 13. In both the open and closed positions of the valve body 14, a steel ball 16 biased by a locking spring 15 is engaged in respective locking grooves 17 formed in the flow rate adjusting knob 13, thereby stably keeping the valve body 14 in either of the open and closed positions.

In the embodiment, as described above, the flow rate adjusting knob 13 is used as the valve shaft of the safety valve mechanism. But a member different from the flow rate adjusting knob 13 may be used as the valve shaft of the safety valve.

Figure 3:
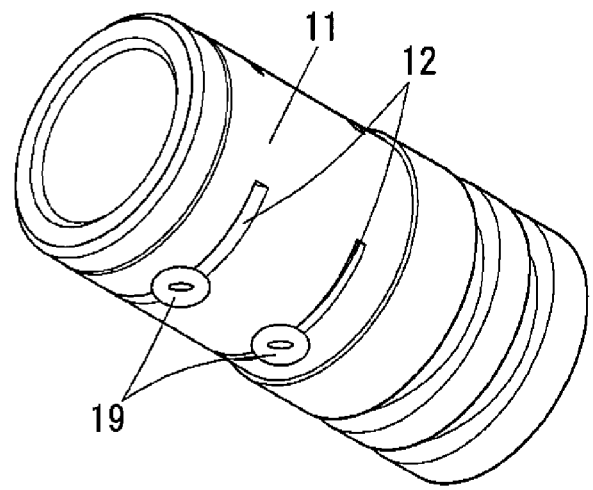
FIG. 3 is a perspective view of a flow rate adjusting member used in the fuel valve, schematically showing how O-rings are brought into abutment with the flow rate adjusting member.
Figure 4:
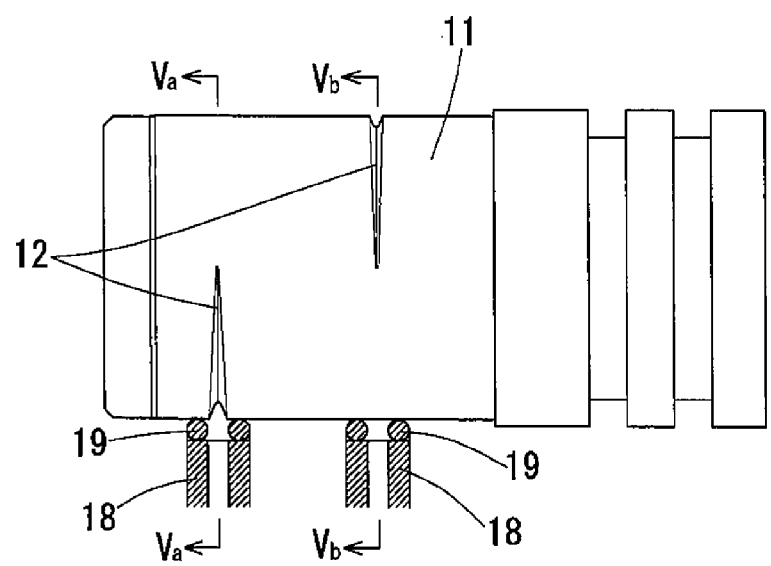
FIG. 4 is a side view of a flow rate adjusting member used in the fuel valve according to the present invention.

Now referring to FIGS. 3 to 5, description is made of how the flow rates of liquid fuel L and air A are adjusted by the flow rate adjusting member 11. Delivery members 18 are provided in the liquid fuel passage 4 and the air passage 5, respectively. The delivery members 18 carry O-rings 19, respectively, which are in abutment with the cylindrical surface of the flow rate adjusting member 11 (as shown in FIG. 3; no delivery members 18 are shown in FIG. 3). The O-rings 19 (and the delivery members 18) are biased toward and against the cylindrical surface of the flow rate adjusting member 11 by delivery side springs 20 provided in the respective passages 4 and 5 (see FIGS. 2(a) and 2(b)).

Figure 5A:
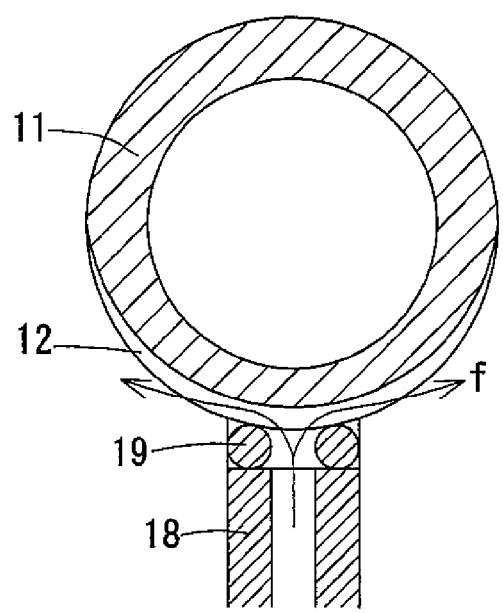
FIGS. 5(a) and 5(b) are sectional views of the flow rate adjusting member shown in FIG. 4, taken along line Va-Va and line Vb-Vb of FIG. 4, respectively.
Figure 5B:
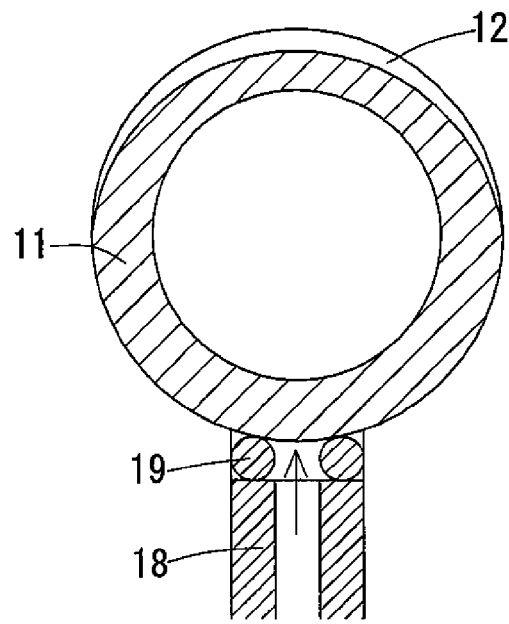

As described above, the flow rate adjusting member 11 is rotatable about its axis. As the flow rate adjusting member 11 rotates, the relative position between the V-shaped grooves 12 and the O-rings 19 changes. When the flow rate adjusting member 11 is rotated to a position where one of the O-rings 19 straddles the corresponding V-shaped groove 12 (see the portion of FIG. 4 along line Va-Va), this V-shaped groove 12 is connected to the discharge port of the corresponding supply pipe 9 or 10 in the flow passage 4 or 5, so that liquid fuel L or air A can flow into the V-shaped groove 12 (as shown in FIG. 5(a)). When the flow rate adjusting member 11 is rotated to a position where one of the O-rings 19 is located where there is not the corresponding V-shaped groove 12 (see the portion of FIG. 4 along line Vb-Vb), this V-shaped groove is not connected to the discharge port of the corresponding supply pipe, so that liquid fuel L or air A cannot flow into the V-shaped groove 12 (as shown in FIG. 5(b)).

The two V-shaped grooves 12 of the flow rate adjusting member 11 are used to individually and separately adjust the flow rates of liquid fuel L and air A. The liquid fuel L and the air A that have flowed into the respective V-shaped grooves 12 then flow into the gap g between the inner wall of the fuel mixing chamber 3 and the cylindrical surface of the flow rate adjusting member 11 and are mixed together there. The air-fuel mixture is then fed through the fuel discharge port 6 to the burner (not shown), as shown by the arrows f in FIG. 2(b).

The shapes (depths and widths) of the respective two V-shaped grooves 12 and the positional relationship between the two grooves 12 are suitably determined based on how and in what way the burner is used. For example, if the burner uses a liquid fuel L such as gasoline or kerosene, it is ordinarily necessary to heat a vaporizer beforehand by conducting the above-described preheating step before normal burning.

Figure 6A:
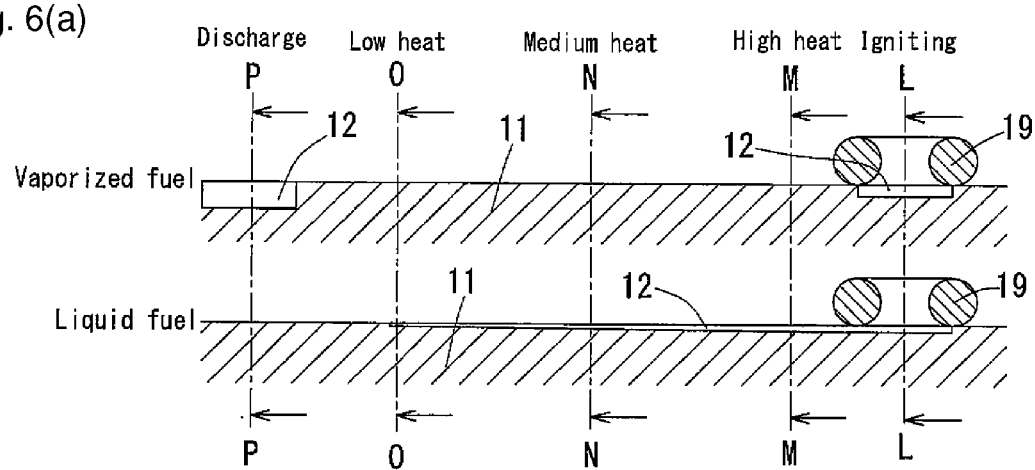
Figure 6B:
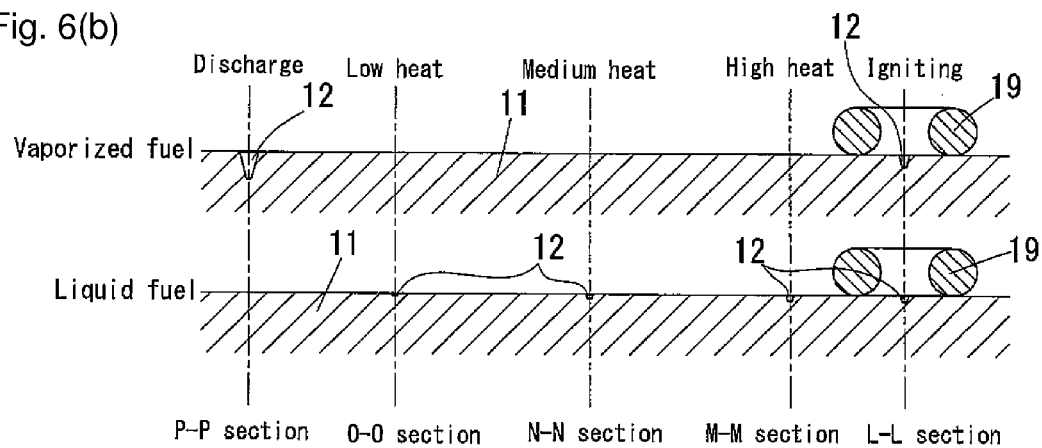

The fuel valve according to the present invention can individually and separately adjust the flow rates of liquid fuel L and air A in order to heat the vaporizer in the preheating step before normal burning and to reduce the pressure in the tank to the atmospheric pressure after use by discharging liquid fuel L remaining in the fuel passages. The V-shaped grooves 12 are formed e.g. as shown in FIGS. 6(a) and 6(b) to realize the above-mentioned adjustment of flow rates.

By operating the flow rate adjusting knob 13, it is possible to adjust the flow rates of liquid fuel L and air A in a simple manner. In particular, the flow rate adjusting knob 13 can be moved to any of the "igniting" position (position L in FIG. 6(a)), in which the preheating step is performed, the heat adjusting positions, i.e. from the "high heat" to "low heat" positions (positions M to O in FIG. 6(a)), and the discharge position after use (position P in FIG. 6(a)). The V-shaped groove 12 for liquid fuel L extends between the "igniting" position and the "low heat" position such that its depth and width both decrease toward the "low heat" position. The V-shaped groove 12 for air A includes first and second portions formed at the "igniting" position and the "discharge" position, respectively, with the second portion deeper and wider than the first portion.

At the "igniting" position, both liquid fuel L and air A flow, so that air A is used to burn liquid fuel L. Thus at the "igniting" position, fuel can be burned stably, which allows smooth heating of the vaporizer. During normal burning at any position between the "high heat" and "low heat" positions, only liquid fuel L flows, which is vaporized in the vaporizer. When the thus vaporized fuel is injected through the nozzle of the burner, air for burning is taken in.

At the "low heat" position, since the pressure of the vaporized fuel injected through the nozzle is low, it may be difficult to take in a sufficient amount of air necessary for burning. In such a case, the V-shaped groove 12 for air A may be formed such that at the "low heat" position, air A in the tank can be taken in together with liquid fuel L.

At the "discharge" position, only air A flows to discharge any liquid fuel L remaining in the fuel passages under the pressure of air A. This prevents rusting in the pipes due to impurities in the remaining liquid fuel L and clogging of the pipes. Also, since the pressure in the fuel tank is reduced to the atmospheric pressure, the tank can be handled safely during transportation and storage.

Needless to say, the igniting position, the "high heat" to "low heat" positions, and the "discharge" positions may not be arranged in the exact order shown in FIGS. 6(a) and 6(b). For example, an "extinguishing" position may be provided between the "low heat" position and the "discharge" position.

Figure 7:
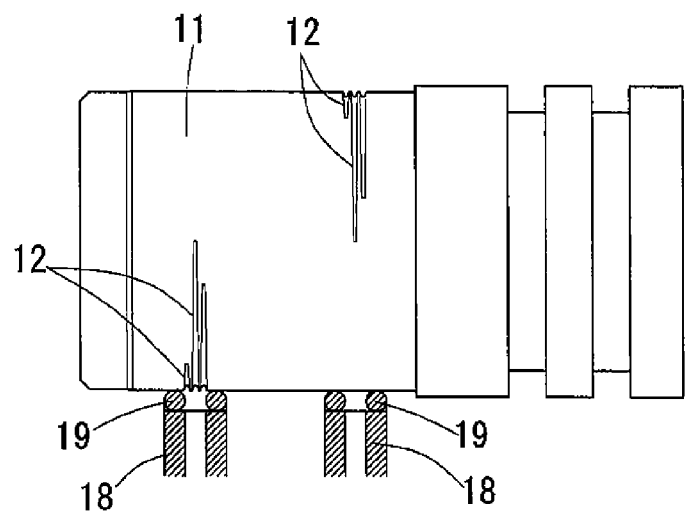
FIG. 7 is a side view of a still different flow rate adjusting member used in the fuel valve according to the present invention.

Instead of providing only one V-shaped groove 12 for each delivery member 18 as shown in FIG. 4, a group of a plurality of V-shaped grooves 12 may be provided corresponding to each of the delivery members 18 as shown in FIG. 7. With this arrangement, by displacing the starting and terminal points of each of the V-shaped grooves 12 in each group from those of the other V-shaped grooves, and/or by changing the depths and widths of the respective V-shaped grooves 12 in the circumferential direction thereof, it is possible to more finely adjust the flow rates of fuel and air.

Figure 8:
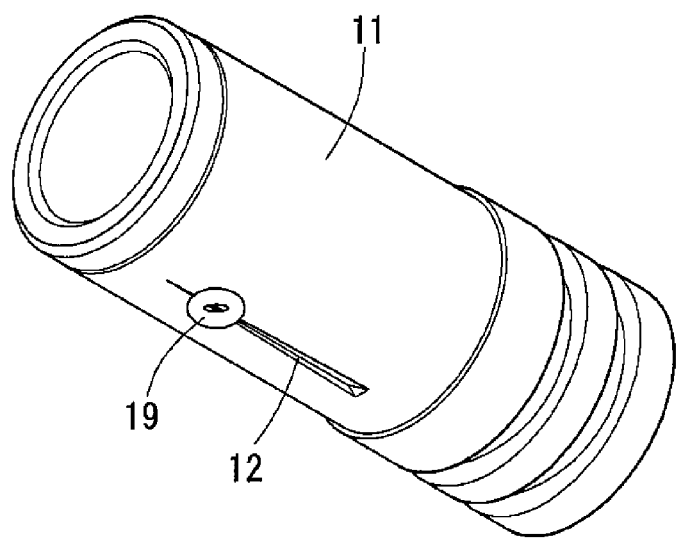
FIG. 8 is a side view of a further different flow rate adjusting member used in the fuel valve according to the present invention.

FIG. 8 shows a different arrangement in which the cylindrical flow rate adjusting member 11 is formed with a single V-shaped groove 12 extending in the axial direction of the flow rate adjusting member 11. In this arrangement, by sliding the O-ring 19 and the V-shaped groove 12 relative to each other in the axial direction, it is possible to adjust the flow rate of fuel in the same manner as with the flow rate adjusting member 11 shown e.g. in FIG. 4.

Any of the V-shaped grooves 12 shown above may be replaced by any other groove such as a groove having a rectangular cross-section, or by any other recess such as a depression or depressions.

The shape (i.e. depth, width and any other parameter) of each groove is determined in view of the desired flow rate. If, for example, it is desired to feed an extremely small amount of fuel, a narrow and extremely shallow groove should be formed. If it is desired to very finely adjust the flow rate, the groove is formed such that its depth and width change moderately in the direction in which the groove slides relative to the delivery member 18 (O-ring 19). By using V-shaped grooves as the recesses 12, the O-rings 19 can quickly remove any foreign matter stuck in the grooves when the O-rings 19 slide relative to the grooves. This prevents trouble resulting from clogging of the passages (recesses 12).

Needle valves, in which the degree of opening between the orifice and the needle is adjusted by turning the screw, can hardly feed a very small amount of e.g. fuel in a controlled manner, can hardly adjust the flow rate of fuel in a very fine manner, and can hardly prevent clogging of the passages. The flow rate adjusting mechanism according to the present invention therefore provides an enormous advantage over the prior art arrangement. Moreover, since the flow rate adjusting mechanism according to the present invention is assembled simply by bringing the outlet ends of the supply pipes 9 and 10 into abutment with the flow rate adjusting member 11, it is simple in structure and thus durable, and its maintenance is easy.

In the above embodiments, the flow rates of liquid fuel L and air A are individually adjusted using a plurality of V-shaped grooves (recesses 12). But instead, only the flow rate of liquid fuel L may be adjusted using a single V-shaped groove (recess 12), or more than three V-shaped grooves (recesses) may be formed to individually adjust the flow rates of three or more kinds of fluids, such as liquid fuel L, vaporized fuel and air A.

The flow rate adjusting member 11 according to the present invention is not limited to a cylindrical member, but may be a conical member or a member in the shape of a flat plate.

What is claimed is:

1. A fuel valve comprising:
   supply pipes having first ends, respectively, located in a tank in which liquid fuel and air coexist such that the liquid fuel and the air can flow through the respective supply pipes, whereby flow rates of the liquid fuel and air can be individually adjusted; and
   a flow rate adjusting member formed with recesses in a surface of the flow rate adjusting member, wherein the supply pipes have second ends, respectively, kept in abutment with the surface of the flow rate adjusting member,
   wherein the recesses and the supply pipes are configured such that the recesses can be moved relative to the respective second ends to predetermined positions where the recesses extend across and protrude from the respective second ends, whereby the liquid fuel and the air can flow through gaps defined between the respective supply pipes and the corresponding recesses, and
   wherein a first of the recesses has a first depth and a first width, and a second of the recesses has a second depth and a second width, the first depth being greater than the second depth and the first width being greater than the second width.

2. The fuel valve of claim 1, wherein the flow rate adjusting member is a cylindrical member which is rotatable about an axis thereof, and has a cylindrical surface as said surface in which said recesses are formed, wherein the recesses are grooves extending in a rotational direction of the flow rate adjusting member and capable of adjusting the flow rates of the liquid fuel and the air, respectively, wherein the flow rate adjusting member has an igniting position, heat adjusting positions, and a discharge position which correspond to respective rotational angles of the flow rate adjusting member, wherein at the igniting position, the recesses for the liquid fuel and the air are both aligned with the respective second ends, wherein at the heat adjusting positions, the portion of the recess for the liquid fuel that is aligned with the corresponding second end is larger in sectional area at a higher heat position of the heat adjusting positions than at a lower heat position of the heat adjusting positions, and wherein at a discharge position, only the recess for the air is aligned with the corresponding second end.

3. The fuel valve of claim 1, wherein the flow rate adjusting member is a cylindrical member, and wherein said surface of the flow rate adjusting member, in which said recess is formed, is a cylindrical surface.

4. The fuel valve of claim 3, wherein said recesses are grooves extending in a direction in which the recesses move, and wherein the recesses have a depth or width that changes in said direction such that the grooves have a sectional area that changes in said direction, whereby the flow rates of fuel that flows through the grooves are adjustable.

5. The fuel valve of claim 1, wherein said recesses are grooves extending in a direction in which the recesses move, and wherein the recesses have a depth or width that changes in said direction such that the grooves have a sectional area that changes in said direction, whereby the flow rates of fuel that flows through the grooves are adjustable.

6. The fuel valve of claim 1, wherein the tank contains the liquid fuel in a lower part of the tank, and the air in an upper part of the tank above the fuel, the first end of a first of the supply pipes is located in the liquid fuel in the lower part of the tank to supply the liquid fuel from the tank toward the flow rate adjusting member, and the first end of a second of the supply pipes is located in the upper part of the tank above the liquid fuel to supply the air from the tank toward the flow rate adjusting member.

7. The fuel valve of claim 1, wherein each of the recesses is a V-shaped groove.

8. A fuel valve arrangement comprising:
a tank for containing liquid fuel in a lower part thereof, and air in an upper part thereof above the liquid fuel;
a fuel mixing chamber including a fuel discharge port, a liquid fuel supply port, and an air supply port;
a cylindrical flow rate adjusting member movably disposed in the fuel mixing chamber;
a liquid fuel supply pipe having a first end located in the lower part of the tank and a second end kept in abutment with the surface of the flow rate adjusting member to supply fuel from the tank toward the flow rate adjusting member; and
an air supply pipe having a first end located in the upper part of the tank and a second end kept in abutment with the surface of the flow rate adjusting member to supply air from the tank toward the flow rate adjusting member;
wherein the flow rate adjusting member has first and second recesses formed therein, and the cylindrical flow rate adjusting member is movable in the fuel mixing chamber to selectively move the cylindrical flow rate adjusting member to cause the first and second recesses to be moved relative to the second ends of the liquid fuel supply pipe and the air supply pipe, respectively, to predetermined positions where the first and second recesses extend across and protrude from the second ends, respectively, of the liquid fuel supply pipe and the air supply pipe, whereby fuel can flow respectively through a gap defined between the second end of the liquid fuel supply pipe and the first recess and through a gap defined between the second end of the air supply pipe and the second recess.

9. The fuel valve arrangement of claim 8, further comprising
a fuel rate adjustment knob movably disposed partly in the fuel mixing chamber; and
a valve body movable with the fuel rate adjustment knob between a position closing the fuel discharge port and a position opening the fuel discharge port;
wherein the fuel rate adjustment knob is operably connected with the fuel rate adjustment member such that the fuel rate adjustment knob is axially slidable relative to the fuel rate adjustment member and is rotationally fixed for rotation with the fuel rate adjustment member.

* * * * *